May 26, 1959

H. A. GREENWALD 2,888,193

MOTOR DRIVEN COMPRESSOR

Filed Feb. 14, 1957

HAROLD A. GREENWALD,
INVENTOR.

BY John H.G. Wallace

United States Patent Office 2,888,193
Patented May 26, 1959

2,888,193

MOTOR DRIVEN COMPRESSOR

Harold A. Greenwald, Los Angeles, Calif., assignor to The Garrett Corporation, Los Angeles, Calif., a corporation of California Application February 14, 1957, Serial No. 640,132

6 Claims. (Cl. 230—117)

This invention pertains to electric motor driven refrigeration compressors and more particularly to a fully sealed, motor driven refrigeration compressor.

In all refrigeration compressors, two problems exist, one that of lubricating the bearings and the other that of sealing the compressor to prevent the escape of the refrigerant. The problem of sealing the compressor unit to prevent the escape of the refrigerant can be largely solved by enclosing both the compressor and driving motor in a hermetically sealed housing. The problem may also be solved by enclosing them in a housing having bolted joints which incorporate static seals and having only compressor inlet and discharge openings for the refrigerant used in the system. While this approach solves the problem of leakage it does not solve the problem of lubricating the bearings or cooling the driving motor.

This invention would solve the problem of lubricating the bearings and cooling the driving motor of a compressor while still maintaining a sealed unit, by mixing a small quantity of oil with the refrigerant being circulated in the system. In order to provide for the lubrication function, a small quantity of the refrigerant and oil mixture is admitted in the vicinity of the bearings and allowed to leak through the required internal seals. The refrigerant will cool the bearings, the internal seals and the motor stator and rotor while the oil will supply the necessary lubrication. After passing through the bearings, the seals and the motor, the refrigerant and oil mixture is returned to the suction inlet of the compressor where it may again be circulated through the system.

Accordingly, it is a principal object of this invention to provide a sealed type vapor cycle refrigeration motor-compressor unit with a novel lubricating and cooling system.

It is another object of this invention to provide in a cooling system for a motor adapted to drive a refrigeration compressor in a sealed type unit, unique means for removing both the heat losses which occur in the motor rotor and the heat losses which occur in the motor stator.

It is another object of this invention to provide a refrigeration compressor motor with a unique cooling and lubricating system which has no moving parts and which utilizes the refrigerant being circulated by the compressor, mixed with a suitable quantity of lubricant, as the cooling and lubricating medium.

These and other objects and advantages of this invention will be more easily understood by those skilled in the art from the following detailed description of a preferred embodiment when taken in conjunction with the attached drawing in which.

Figure 1:
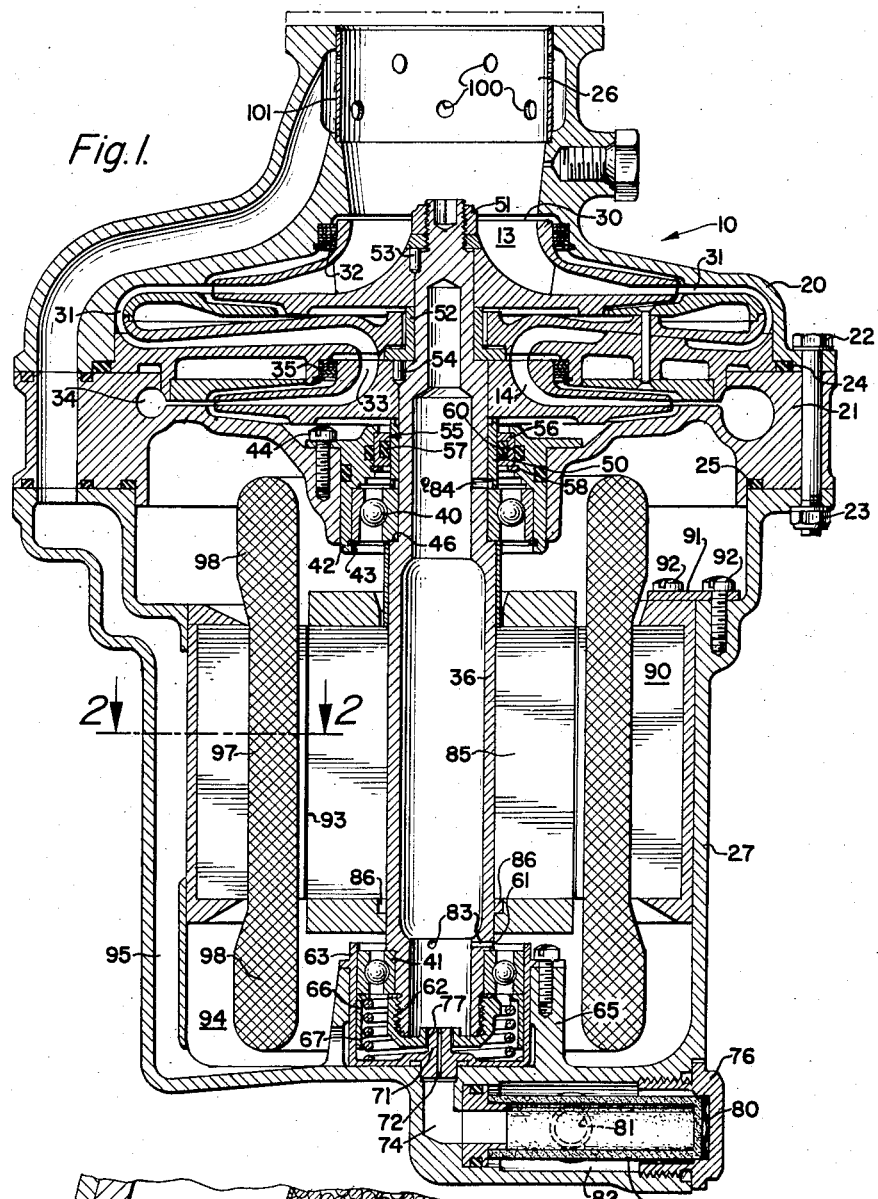
Fig. 1 is a cross-section of a sealed type, electric motor driven compressor unit incorporating the lubrication and cooling system of this invention.

Referring particularly to Fig. 1, there is shown a compressor unit 10 whose lower surface is closely fitted to the upper surface of the motor housing 27. A motor unit is mounted in the motor frame and has an upwardly extending shaft on which the first stage impeller 13 and second stage impeller 14 of the compressor are mounted. Suitable seal means are provided between the motor compartment and the compressor section, so as to provide a restricted flow of refrigerant along the shaft between the compressor and the motor compartment.

The compressor section of the unit is provided with an outer housing having an upper casing 20 and a lower scroll casing 21 which are joined together to form the housing around the upper portion of the unit. The upper casing and scroll casing of the compressor are joined to the tubular motor housing 27 by means of a plurality of circumferentially spaced bolts 22 and nuts 23 which pass through outwardly extending flanges formed on the various parts. In order to ensure a substantially leak-proof seal between the various housing parts, O rings 24 and 25, are provided. The upper casing 20 of the compressor section is provided with a suction inlet 26 which conducts the refrigerant being circulated to the inlet eye 30 of the first stage impeller. The first stage impeller 13 is provided with a suitable labyrinth or equivalent type seal 32 which surrounds the outer surface of inlet eye 30 in order to restrict refrigerant from flowing from the impeller discharge back to the inlet eye. The refrigerant discharged by the first stage impeller 13 is conducted by means of a passageway 31 to the inlet eye 33 of the second stage impeller 14. The second stage impeller 14 is also provided with a seal 35 which surrounds the inlet eye 33 of the impeller in order to restrict the refrigerant from flowing from the discharge of the second impeller back to the inlet eye thereof. The refrigerant discharged from the second stage impeller 14 is collected by a scroll-shaped passageway 34 formed in the scroll casing 21 of the compressor and conducted to a suitable discharge opening not shown in Fig. 1.

The motor is provided with a rotor 85 which is mounted on a shaft 36 by any desired means such as, a press fit or the like. A plurality of circumferentially spaced projections 86, formed on the lower portion of the shaft 36, are provided to insure that the rotor 85 rotates with the shaft 36. The shaft 36 is provided with extensions at each end which are rotatably mounted in bearings 40 and 41. The outer race of upper ball bearing 40 is secured in a bearing retainer 42 by means of a snap ring 43. The bearing retainer 42 in turn is secured to scroll casing 21 of the compressor housing by means of a plurality of circumferentially spaced cap screws 44 which pass through an outwardly extending flange on the bearing retainer 42 and thread into scroll casing 21. The inner race of the ball bearing 40 is locked against an outwardly projected shoulder 46 formed on the motor shaft 36 by means of a shaft nut 51 which threads onto the upper end of the shaft 36. The nut 51, in addition, secures the impellers 13 and 14 and spacing members 50 and 52 to the shaft. Spacing members 50 and 52 are mounted between the bearing 40 and second stage impeller 14 and between the second stage impeller 14 and first stage impeller 13, respectively, in order to properly position the impellers with reference to the remainder of the unit. Two dowel pins 53 and 54 are used to lock the impellers 13 and 14, respectively, to the shaft 36.

The above described construction thus provides a means whereby the two stage compressor unit and its driving motor may be enclosed within a hermetically sealed type of outer housing.

The compressor section is isolated from the motor compartment by means of a seal assembly 55 having a carbon ring 57 which is retained in an outer ring 56. The carbon ring 57 co-operates with the outer surface of the spacing member 50, described above, to effectively restrict to a very small amount the flow of refrigerant from the compressor into the motor compartment. It is necessary to limit the flow of refrigerant to maintain compressor efficiency and maintain the motor compartment at the lowest practical pressure to permit the refrigerant used to cool the bearings and motor to expand into a low pressure region and evaporate at low temperature. In addition this low pressure reduces windage losses in the motor. The carbon ring assembly is retained in the bearing retaining member 42 by means of an upwardly projecting shoulder at the top and a snap ring 58 at the bottom. The outer surface of the ring assembly is sealed by means of an O ring 60 or similar seal which is mounted in a cooperating groove formed in the bearing retainer 42.

The inner race of the lower bearing 41 which rotatably supports the lower extension of the shaft 36 is secured to the shaft by means of a nut 62 which threads over the end of the shaft to lock the inner race against a shoulder 61 formed on the shaft 36. The outer race of the bearing 41 is mounted in a cup-shaped bearing retainer 63 which is secured to a tubular portion 65 of the motor housing 27. The tubular portion 65 projects upwardly from the bottom wall of the motor housing 27 and forms a support for the lower bearing. The outer race of bearing 41 is urged in an upward direction by means of a spring 67 which engages an inwardly projecting flange formed on the end of a tubular member 66. The spring 67 reacts at one end against the bottom of retainer 63 and at the other end against the member 66 to urge the bearing and the shaft upward.

The center portion of the retainer 63 has a raised portion 71 which is provided with a small central opening 72 so as to form an inlet orifice for the cooling and lubricating mixture. The orifice 72 meters the flow of the cooling and lubricating liquid mixture from the high pressure side of the refrigeration system into the motor unit. The upper end of the orifice 72 projects through an opening 77 formed in the nut 62 which threads over the end of the shaft 36. A small amount of clearance is provided between the outer surfaces of the raised portion 71 and the opening 77 in the nut 62, in order to allow free rotation of the motor shaft, yet restrict the escape of the cooling and lubricating mixture at this point. A passageway 74 formed in the bottom wall of the motor housing 27 connects the orifice 72 to the interior of a tubular filter element 75. The filter element 75 may be of any well known design, but is preferably a porous bronze type of filter. The filter element is mounted in a cylindrical chamber 82 also formed in the bottom wall of the motor housing 27 and is secured in place by means of a small end cap 76 which threads into the chamber 82, and a wave spring 80 which urges the filter element to the left. The outer surface of the filter element is sealed to the inner surface of the chamber 82 by an O ring at the left hand end of the filter element. An opening 81 is provided in the side wall of the chamber 82 so that the cooling and lubricating liquid mixture may flow into the chamber 82. While no connection from refrigeration system to the chamber 82 is shown in Fig. 1, it is preferable to connect the chamber 82 to the receiver employed in the refrigeration system of which the compressor unit forms a part. This will ensure that a mixture containing substantially only liquid refrigerant and lubricant is supplied to the chamber 82. After the cooling and lubricating mixture passes through the orifice it will flow up through the shaft 36 and out through radial openings 83 and 84 formed in the motor shaft adjacent the lower bearing 41 and upper bearing 40 respectively.

The above described cooling and lubricating system will thus supply a metered amount of liquid refrigerant and lubricant to the interior of the shaft 36. As the mixture flows from the orifice 72 into a region of lower pressure, a portion of the liquid refrigerant will be converted into a gas due to expansion. This will lower the overall temperature of the refrigerant and allow it to cool the rotor and bearings. As the cooling and lubricating liquid and gas mixture flows upward through the shaft 36, some of the mixture will, by centrifugal action, pass through the lower holes 83. By properly sizing the total cross-sectional area of the lower holes 83 in relation to the total cross-sectional area of the upper holes 84, it is possible to provide the desired distribution of the coolant and lubricant to the bearings 40 and 41. The total cross-sectional area of the lower holes 83 should in all cases be less than the total area of the upper holes 84 but the exact proportion will vary depending on the particular design criteria. As the cooling and lubricating mixture flows upward through the shaft, a large portion of the heat generated in the motor rotor will be transferred to the refrigerant contained in the mixture through the wall of the shaft 36. The opening in the orifice 72 should be sized to admit a larger volume of refrigerant and lubricant than can be converted to a gas inside the hollow shaft 36, to insure that a quantity of liquid refrigerant will flow out the upper holes 84. This quantity of liquid refrigerant will be converted to a gas due to further expansion, thus cooling the upper bearing 40 and also the stator 90 of the motor as it passes down through the magnetic gap slot and openings 93.

Figure 2:
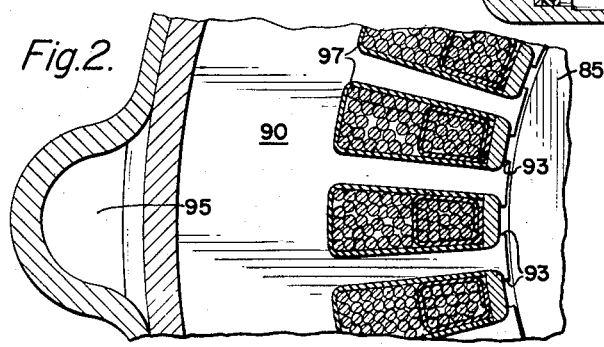
Fig. 2 is a partial cross-sectional view taken along lines 2—2 of Fig. 1 and drawn to an enlarged scale showing the longitudinal slots in the stator which, with the magnetic gap of the motor, allow the cooling and lubricating fluid components to flow from the upper bearing opening to the bottom of the motor.

The stator assembly 90 which consists of a stack of suitable laminations and stator windings is secured to the motor housing 27 by means of a plurality of strips 91. Each of the strips 91 is secured to both the stator and the motor housing by means of cap screws 92 which pass through the strip and thread into both the motor housing and the stator assembly. The stator laminations are provided with a plurality of circumferentially spaced slots as shown in Fig. 2 which terminate in small openings 93 on the inner surface of the laminations. Suitable stator windings 97 are positioned in the slots and terminate in end turns 98 at each end. The slot openings 93 in the stator laminations form a plurality of longitudinal slots on the inner surface of the stator assembly which also add to the area through which the cooling and lubricating mixture may flow over the inner surface of the stator assembly 90 and the outer surface of the rotor 85. The heat generated in the stator and rotor will thus be transferred to the refrigerant and oil contained in the mixture. After the mixture flows to the bottom of the motor housing 27, it is collected in the annular space 94 surrounding the bottom end turns 98 of the stator assembly. From the annular space 94, the mixture flows back to the suction inlet of the compressor through a passageway 95 formed in the side of the motor housing and the compressor housing. The mixture flows back into the inlet eye 30 of the compressor through openings 100 formed in a tubular sleeve 101 mounted in the suction inlet 26 of the compressor.

The refrigerant circulated in the system is preferably one of the vapor cycle refrigerants such as dichlorotetrafluorethane known commercially as Freon 114. A small quantity of oil (1% or less by weight) is mixed with the refrigerant and continually circulates in the system. It may be noted here that the oil-Freon mixture boiling in the evaporator bubbles and foams so that the oil component in the mixture is carried into the compressor suction line by the velocity of the Freon gas leaving the evaporator. A motor compressor unit constructed in accordance with this invention has been operated continuously with only one tenth of one percent (0.1%) oil in the mixture.

The liquid refrigerant and oil mixture which is collected in the receiver is conducted to the opening 81 in the cylindrical chamber 82 at the bottom of the motor unit by any desired means not shown. When the unit is operated, a small quantity of this mixture, the amount of which is controlled by the orifice 72, will be admitted to the interior of the hollow shaft 36 where a portion will be converted to a gas due to the pressure in the region into which it expands. A portion of the mixture which is admitted at the interior of the hollow shaft flows out lower openings 83 and cools and lubricates the lower bearing 41. The remainder of the liquid and gas mixture will flow upward through hollow shaft 36 and pass out the upper opening 84 where it will cool and lubricate the upper bearing 40. After passing over the upper bearing 40, the mixture will flow over the inner surface of the stator 90 and the outer surface of the rotor, thus cooling both the rotor and stator assembly. The mixture in the form of Freon gas and liquid oil will be withdrawn from the bottom of the housing 27 and returned to the refrigerant flowing into the suction inlet of the compressor by the reduced pressure which exists in the suction inlet.

In order to provide the desired refrigerant flow and refrigeration capacity in the evaporator, it is necessary with this cooling and lubricating system to make the compressor capacity slightly larger than required for the evaporator flow alone in order to provide for the additional flow (about 6%) used for cooling. This does not necessarily mean that a proportionately larger power input to the unit is required, since it is inherent in the characteristics of a centrifugal compressor to have better efficiency with increased size.

While only one embodiment of this invention has been described in detail, many modifications and improvements will occur to those skilled in this art.

I claim:

1. A sealed refrigeration unit comprising: a centrifugal compressor having a compressor housing and an impeller mounted therein; an electric motor having a motor housing and a stator mounted therein; said compressor and motor housings being joined together to form a sealed unit; a hollow shaft; a rotor mounted on said hollow shaft, said shaft extending from each end of said rotor and having one closed end, said impeller being mounted on said shaft extension having the closed end; support means for rotatably mounting said shaft in said motor housing; means for introducing a restricted quantity of a cooling and lubricating fluid into the interior of said hollow shaft, said fluid comprising a mixture of refrigerant and a small quantity of lubricant; openings in said shaft adjacent said shaft support means for allowing said fluid to flow over said supports; and means for returning the fluid admitted into said hollow shaft to the inlet of said compressor.

2. A sealed motor compressor unit for handling refrigerants comprising: a rotary impeller mounted in an impeller housing; a hollow shaft; an electric motor having a rotor mounted on said hollow shaft, said shaft extending beyond the rotor at each end, said impeller being mounted on one of said shaft extensions; a tubular motor housing containing a stator having a central opening; said rotor being mounted in said opening by means of a bearing on each of said shaft extensions; said hollow shaft being closed at the end of said one shaft extensions and open at the end of the other of said shaft extensions; means for introducing a small quantity of the refrigerant being circulated by said compressor unit mixed with a lubricant into the open end of said hollow shaft; openings in each of said shaft extensions adjacent said bearings; and means for withdrawing said refrigerant and lubricant from said motor housing.

3. A sealed motor compressor unit adapted to circulate refrigerants comprising: a compressor having a compressor housing an electric motor having a tubular housing, said motor housing being sealed to the housing of said compressor; a stator having a central opening mounted in said motor housing; a hollow shaft; a rotor mounted on said hollow shaft, said shaft extending beyond the ends of said rotor and being supported by two spaced apart bearings mounted in said motor housing; one of said shaft extensions having a closed end extending into said compressor housing and adapted to drive said compressor; the other of said shaft extensions having an open end; orifice means mounted in said motor housing and projecting into the interior of said hollow shaft, said orifice means being connected to a supply of the refrigerant being circulated by said compressor mixed with a lubricant; at least one opening in said shaft adjacent each of said bearings, the openings in said shaft farthest removed from said inlet orifice means having a larger total area than the other openings in said shaft; and means including a passageway connected to the suction inlet of said compressor and opening into the interior of said motor housing for removing said refrigerant and lubricant from said motor housing.

4. A cooling and lubricating system for an electric motor adapted to drive a vapor cycle refrigeration compressor comprising: means for introducing a quantity of the refrigerant being circulated by said compressor mixed with a small quantity of lubricant into the interior of said motor rotor; expansion means in the interior of said rotor for expanding a portion of said refrigerant and lubricant mixture; additional means in the interior of said rotor for directing the lubricant contained in said mixture over the bearings of said motor; additional expansion means in said motor for expanding the remainder of said mixture; flow control means for directing a portion of said expanded mixture over the stator and outer surface of the rotor of said motor, and means for withdrawing the expanded refrigerant and oil mixture from said motor.

5. A sealed refrigeration unit comprising: a motor compartment; a stator having a central opening mounted in said motor compartment; a hollow shaft; a rotor mounted on said hollow shaft, said shaft being rotatably supported in said motor compartment by spaced apart bearings; said shaft having a closed end extending beyond one end of the motor compartment; a rotary impeller mounted in an impeller housing and driven by said closed end shaft extension; said impeller housing being attached to said motor compartment so as to form a substantially sealed unit; shaft seal means mounted in said motor compartment and surrounding said shaft so as to isolate said impeller housing from said motor compartment; means for introducing a cooling and lubricating mixture into the interior of said hollow shaft, said mixture comprising a portion of the refrigerant circulated by said impeller and a lubricant; at least one opening in the peripheral wall of said shaft adjacent each of said bearings; longitudinal passage means formed on the inner surface of said stator; and means for withdrawing said mixture from said motor compartment.

6. A sealed motor compressor unit for handling refrigerants comprising: a rotary impeller mounted in an impeller housing having an inlet and a discharge passage; a hollow shaft; an electric motor having a rotor mounted on said hollow shaft, said shaft extending beyond the rotor at each end and being closed at one end and open at the other end, said impeller being mounted on one of said shaft extensions; a tubular motor housing joined to said impeller housing to form a sealed unit, said motor housing containing a stator having central openings; longitudinal passage means formed on the inner surface of said stator; said rotor being mounted in said opening by means of bearings on said shaft extensions; means for introducing a small quantity of the refrigerant being circulated by said impeller mixed with a lubricant into the open end of said hollow shaft; openings in said shaft adjacent the bearings for allowing said fluid mixture to flow over said bearings and through said longitudinal passages in said stator; and means for returning the fluid mixture admitted to said hollow shaft to the inlet of said impeller.

References Cited in the file of this patent
UNITED STATES PATENTS
2,091,752  Davis ------------------ Aug. 31, 1937